Patented Apr. 21, 1936

2,037,740

UNITED STATES PATENT OFFICE 2,037,740

CELLULOSE DERIVATIVE COMPOSITIONS

Paul L. Salzberg, Wilmington, Del., assignor to E. I. du Pont de Nemours & Company, Wilmington, Del., a corporation of Delaware No Drawing. Application January 24, 1934, Serial No. 708,055

14 Claims. (Cl. 106—40)

This invention relates to cellulose derivative compositions and more particularly to cellulose derivative compositions containing as plasticizers water insoluble ethers of water soluble carbohydrates.

Various water insoluble ethers of water soluble carbohydrates have been described by various workers. Thus, Gomberg and Buchler disclose the preparation of benzyl sucrose in J. Am. Chem. Soc. 43 1904 (1921). In the same journal 45 2698 (1923) Adams and Tomecko disclose the preparation of allyl sucrose. Haworth disclosed the preparation of heptamethyl sucrose. These literature articles are concerned with the preparation of the compounds alone.

This invention has as an object the provision of new cellulose derivative compositions comprising water insoluble ethers of water soluble carbohydrates. Further objects are the preparation of new coating compositions, new molding plastics, new adhesives and new impregnating compositions containing these ethers of water soluble carbohydrates in combination with cellulose derivatives and particularly cellulose ethers. Other objects will appear hereinafter.

These objects are accomplished by the following invention which comprises compositions containing water insoluble ethers of water soluble carbohydrates such as sucrose in combination with cellulose derivatives.

One group of sucrose ethers which may be used in accordance with the present invention are the benzyl sucroses. These compounds are light yellow resinous materials varying in physical properties from viscous syrups to hard brittle resins depending on the number of benzyl groups introduced. These ethers, though derived from a soluble sugar, are insoluble in water. They are insoluble in aliphatic hydrocarbons but are soluble in alcohols, esters, ketones, and aromatic hydrocarbons. They are of extremely low volatility, a factor which is for the utmost importance in connection with their utility with cellulose derivatives. They are compatible with, but not ordinarily by themselves solvents for, cellulose esters such as nitrocellulose and cellulose acetate. They are compatible with and are usually of themselves solvents for cellulose ethers such as benzyl or ethyl cellulose and in cellulose derivative plastic compositions may replace wholly or in part the plasticizers already known.

Benzyl sucrose suitable for use in combination with cellulose derivatives has been prepared as follows: One hundred thirty-seven parts by weight of cane sugar, 222 parts by weight of benzyl chloride, 200 cc. of 10% sodium hydroxide solution were mixed and heated to 90° C. with efficient mechanical stirring on a steam bath. At fifteen minute intervals additional 100 cc. portions of 10% sodium hydroxide solution were added until a total of 760 cubic centimeters of alkali solution had been added. Steam-bath heating was then continued for 3½ hours. The aqueous upper layer was separated off and the lower layer was steam distilled to remove any excess of benzyl chloride. The product was then washed with water until quite neutral, dissolved in a 50% mixture of benzene and chloroform, dried over sodium sulfate and the solvent removed by heating at 100° C. under reduced pressure. The yield obtained amounted to 196 parts by weight of a product having an average of 3.4 benzyl groups per molecule of sucrose. By decreasing the proportion of benzyl chloride benzylated sucroses containing fewer benzyl groups per mole of sucrose may be readily obtained. Conversely, the degree of benzylation may be increased by increasing the proportion of benzyl chloride used.

Ethylated sucrose suitable for use in this invention has been prepared as follows: 34.2 parts by weight of cane sugar, 74.4 parts by weight of ethyl chloride, 48 parts by weight of sodium hydroxide, 10.6 parts by weight of sodium carbonate, 116 parts by weight of benzene were heated in a closed vessel with agitation at 140° for six hours. Evaporation of the filtered and dried benzene solution yielded ethylated sucrose, a liquid insoluble in water and soluble in the usual organic solvents, including aliphatic hydrocarbons, and compatible with cellulose derivatives. This ethylated sucrose contained approximately five ethyl groups per mole of sucrose.

Allyl sucrose suitable for use in this invention has been prepared as follows: To 34.2 parts by weight of cane sugar dissolved in 30 parts of water, heated to 70–75° C. were slowly added simultaneously 96.8 parts of allyl bromide and 36 parts of sodium hydroxide in 10% aqueous solution. After the addition requiring one and one-half hours was complete, heating was continued at 80–85° for one hour. Extraction of the product with benzene and evaporation of the solvent gave 25.5 parts by weight of a yellow, viscous liquid which was insoluble in water and aliphatic hydrocarbons, and was soluble in alcohols, ketones, esters, and aromatic hydrocarbons and chlorinated solvents. This compound which contained five allyl groups per mole of sucrose was compatible with nitrocellulose in all proportions and showed limited compatibility with cellulose acetate.

Allyl sucrose shows the surprising property of drying by oxidation similar to that of linseed oil. Allyl sucrose containing a small percentage of cobalt dries to a hard clear film which is practically tack-free in one hour at 100° and in two to three days in the air at room temperature. Without drier the same result is accomplished in 4 to 6 hours at 100° and in 12 to 14 days at room temperature.

The following examples of the invention are included merely for purposes of illustration and are not to be regarded as limitations.

Typical coating compositions containing sucrose ethers are given as follows:

Example 1

This example illustrates the manufacture of a clear lacquer. Ten parts of alcohol-wet low viscosity nitrocellulose, 4 parts of damar, 5 parts of benzyl sucrose containing 3.4 benzyl groups per mol of sucrose, 6 parts of tricresyl phosphate, and 45 parts of a solvent mixture containing 30 parts of ethyl lactate and 15 parts of benzene. The above were thoroughly mixed until a homogeneous solution was obtained and then diluted with 10 parts of toluene.

Example 2

Twelve parts of benzyl cellulose (having a viscosity of 1 c. g. s. unit in 10% solution in a mixture of toluene and alcohol 80:20), 5 parts of copal, 12 parts of benzyl sucrose as in Example 1, 50 parts of toluene, 26 parts of alcohol. The benzyl cellulose was thoroughly incorporated in the alcohol and other ingredients were added, mixing being continued until a homogeneous solution was obtained.

Example 3

Ten parts of cellulose acetate, 5 parts of ethylated sucrose containing about five ethyl groups per mol of sucrose, 40 parts of ethyl acetate, 12 parts of butyl acetate.

Example 4

Ten parts of cellulose nitrate, 3 parts of allyl sucrose containing five allyl groups per mol of sucrose, 25 parts of ethyl acetate, 17 parts of butyl acetate, 9 parts of toluene.

Example 5

Ten parts of cellulose acetate, 3 parts of benzyl sucrose as in Example 1, 51 parts of toluene, 9 parts of ethyl acetate, 9 parts of cellosolve, 9 parts of cellosolve acetate, 9 parts of butyl alcohol.

Example 6

Seven parts of ethyl cellulose, 3 parts of ethylated sucrose as in Example 3, 90 parts of solvent consisting of a mixture of ethyl alcohol and toluene.

These compositions give hard, clear films with good water resistance and luster.

The sugar ethers are also useful in plastic compositions from which molded articles are produced. The following example is illustrative of a composition of this type which contains benzyl sucrose as a plasticizer, blanc fixe as a filler, and benzyl cellulose as a binder.

Example 7

Seventy-five parts of benzyl cellulose as in Example 2, 2 parts of copal resin, 5 parts of benzyl sucrose as in Example 1, 18 parts of blanc fixe, as filler. These ingredients were thoroughly worked together on hot rolls at a temperature of 120° C. The incorporated mass was allowed to cool and then powdered. The powder is suitable for molding by any of the well-known processes applicable, for example, by the injection molding process.

Example 8

Films may be cast from cellulose derivative compositions containing benzyl sucrose. The following example illustrates a benzyl cellulose dope for casting or flowing films. One hundred parts of benzyl cellulose (very low viscosity 0.5 c. g. s. units in a 10% solution in a mixture of 80:20 toluene:alcohol), 100 parts of ethyl alcohol, 10 parts of benzyl sucrose as in Example 1, 400 parts of benzene.

It has been found that the water insoluble ethers of the water soluble carbohydrates are particularly advantageous in cellulose ether compositions. It has been further found that particularly advantageous results are obtained when the non-cellulose portion of the cellulose ether corresponds with the non-sugar portion of the sugar ether, that is, when benzyl cellulose is used with benzyl sucrose, ethyl cellulose with ethyl sucrose, allyl cellulose with allyl sucrose, crotyl cellulose wtih crotyl sucrose, or the corresponding levulose, etc., ethers. Although sucrose is the preferred starting material for the production of the sugar ethers of the compositions of the present invention because of its very great availability, ethers of other water soluble sugars such as glucose, xylose, arabinose, mannose, erythrose, ribose, lyxose, rhamnose, galactose, sorbose, maltose, lactose, melitose, trehalose, fructose, mannoketoheptose, raffinose, etc., may be employed. The propyl, butyl, dodecyl, octadecyl, phenethyl, p-methylbenzyl, crotyl, ethoxyethyl, phenoxyethyl, butoxyethyl, cyclohexyl, methylcyclohexyl, naphthylmethyl, ethers are likewise of use in modifying cellulose derivative compositions. The method of preparation of the sugar ethers outlined above is capable of considerable variation and the present invention is not limited to the use of sugar ethers thus prepared. Sugar ethers of varying degree of etherification may be used. Instead of alkyl or aralkyl halides other etherifying agents such as alkyl or aralkyl sulphates, may be used. As examples of alkylating and aralkylating agents other than those mentioned above may be mentioned propyl sulphate, butyl sulphate, dodecyl chloride, octadecyl chloride, phenethyl chloride, cyclohexyl chloride, naphthylmethyl chloride, butyl bromide, crotyl chloride, tetramethylene dichloride, hexamethylene dibromide, xylylene dibromide, butoxyethyl chloride, and dichlorodiethyl ether. Furthermore, the components of the reaction mixture may be varied considerably. Thus, the proportion of benzyl chloride, etc., may be varied in the benzylation of sucrose to give products of differing degree of benzylation.

Sugar ethers may also be advantageously used in composition containing oils such as Chinawood, linseed, soya bean, coconut, castor, or cotton-seed oil. Pigments such as titanium dioxide pigments, zinc oxide, copper black, lead oxide, chrome green, antimony oxide and lakes may be used. The sugar ethers may also be advantageously used with natural and synthetic resins such as Congo, damar, elemi, Zanzibar, ester gum, ethyl abietate, Congo glycolide, polyhydric alcohol-polybasic acid condensation products, phenol-formaldehyde condensation products, amine-aldehyde condensation products, phenol and lactid resins. Other components may be used such as bitumens, for example of the asphalt type. Fillers such as talc, mica, blanc fixe, or infusorial earth may be used in these sugar ether compositions.

These sugar ethers are advantageous with cellulose derivatives in general, such as the methyl, butyl, dodecyl, allyl, crotyl and benzyl ethers, the acetate, propionate, butyrate, acetate-propionate, furoate, nitrate and sulfate. They may be used in clear or pigmented compositions for rigid or non-rigid surfaces, for example, in coatings for metal or wood, dope for coating fabrics, paper, etc. The sugar ethers in combination with cellulose derivatives may be used with or without fillers or pigments in the manufacture of molded articles. They may also be used as adhesives in the preparation of laminated wood or laminated paper products. They may be employed in the most diverse types of materials, for example, metal, wood, cotton, rubber, fabrics, felt, leather, cork, etc.

The sugar ethers described herein and particularly the benzylated sucroses are viscous liquids to resinous solids. The benzylated sucroses in particular have the property of becoming considerably softer or less viscous as a result of even a relatively small increase in temperature above ordinary atmospheric temperatures. This property of softening or becoming less viscous facilitates the manufacture of plastic compositions containing the ethers. Thus, in the preparation of plastics on hot rolls temperatures unusually low for this operation may be employed. The sugar ethers of the present invention and particularly the benzyl sucroses are very valuable components of cellulose ether films as they do not reduce the tensile strength thereof as do so many other plasticizers therefor.

The sugar ethers possess excellent compatibility characteristics with cellulose derivatives, particularly with nitrocellulose and benzyl cellulose. They have a very low volatility, are surprisingly insoluble in water and are ordinarily soluble in organic lacquer solvents with the exception of aliphatic hydrocarbons. In view of the high insolubility of sugars in organic solvents, the excellent solubility in lacquer solvents and the good compatibilities of benzyl sucroses containing as low as two benzyl groups per sucrose molecule are surprising.

The products containing higher alkyl contents up to the completely alkylated sugar are likewise excellently soluble and of good compatibility. The ready availability and low price of the sugar of the preferred ethers, namely sucrose, is a further point in favor of these excellent modifiers for cellulose derivatives.

As many apparently widely different embodiments of this invention may be made without departing from the spirit and scope thereof, it is to be understood that I do not limit myself to the specific embodiments thereof except as defined in the appended claims.

I claim:

1. Composition comprising a cellulose derivative and, as a plasticizer therefor, a water insoluble ether of a sugar.

2. Composition comprising a cellulose derivative of the class consisting of cellulose nitrate and cellulose ethers and, as a plasticizer therefor, a water insoluble ether of a sugar.

3. Composition comprising a cellulose derivative and, as a plasticizer therefor, a hydrocarbon ether of a sugar.

4. Composition comprising a cellulose derivative of the class consisting of cellulose nitrate and cellulose ethers and, as a plasticizer therefor, a hydrocarbon ether of a sugar.

5. Composition comprising a cellulose ether and, as a plasticizer therefor, a water insoluble ether of a sugar.

6. Composition comprising a cellulose ether and, as a plasticizer therefor, a hydrocarbon ether of a sugar.

7. Composition comprising benzyl cellulose and, as a plasticizer therefor, a benzyl ether of a sugar.

8. Composition comprising benzyl cellulose and, as a plasticizer therefor, benzyl sucrose.

9. Composition comprising ethyl cellulose and, as a plasticizer therefor, a water insoluble ether of a sugar.

10. Composition comprising ethyl cellulose and, as a plasticizer therefor, a hydrocarbon ether of a sugar.

11. Composition comprising ethyl cellulose and, as a plasticizer therefor, an ethyl ether of a sugar.

12. Composition comprising ethyl cellulose and, as a plasticizer therefor, an ethyl ether of a sugar.

13. Composition comprising ethyl cellulose and, as a plasticizer therefor, ethyl sucrose.

14. Composition comprising a cellulose ether and, as a plasticizer therefor, an ether of a sugar, wherein the radicals substituting the hydrogen of the hydroxyl groups in both the cellulose ether and the sugar are the same.

PAUL L. SALZBERG.